United States Patent
Huang et al.

(10) Patent No.: US 8,513,894 B2
(45) Date of Patent: Aug. 20, 2013

(54) LED BULB, LIGHT EMITTING DEVICE CONTROL METHOD, AND LIGHT EMITTING DEVICE CONTROLLER CIRCUIT WITH DIMMING FUNCTION ADJUSTABLE BY AC SIGNAL

(75) Inventors: Pei-Cheng Huang, Jhubei (TW); Ching-Jung Tseng, Eindhoven (NL); Jing-Meng Liu, Jubei (TW)

(73) Assignee: Richtek Technology Corporation, R.O.C., Chupei, Hsinchu (TW)

( * ) Notice: Subject to any disclaimer, the term of this patent is extended or adjusted under 35 U.S.C. 154(b) by 155 days.

(21) Appl. No.: 12/584,149

(22) Filed: Sep. 1, 2009

(65) Prior Publication Data

US 2010/0066266 A1    Mar. 18, 2010

Related U.S. Application Data

(60) Provisional application No. 61/192,610, filed on Sep. 18, 2008.

(51) Int. Cl.
*H05B 37/02* (2006.01)

(52) U.S. Cl.
USPC .............................. 315/291; 315/302; 315/224

(58) Field of Classification Search
USPC ................. 315/291, 272, 279, 300, 302, 224, 315/194, 200 R; 363/21.01, 36, 74, 100, 363/118
See application file for complete search history.

(56) References Cited

U.S. PATENT DOCUMENTS

| | | | |
|---|---|---|---|
| 7,358,679 B2 | 4/2008 | Lys et al. | |
| 7,852,017 B1 * | 12/2010 | Melanson | 315/291 |
| 2005/0253533 A1 * | 11/2005 | Lys et al. | 315/224 |
| 2007/0188114 A1 | 8/2007 | Lys et al. | |
| 2008/0150450 A1 * | 6/2008 | Starr et al. | 315/294 |
| 2009/0184666 A1 * | 7/2009 | Myers et al. | 315/297 |
| 2010/0013409 A1 * | 1/2010 | Quek et al. | 315/294 |

FOREIGN PATENT DOCUMENTS

| | | |
|---|---|---|
| JP | 2004-327152 | 11/2004 |
| JP | 2007-189004 | 7/2007 |

* cited by examiner

*Primary Examiner* — Jimmy T Vu
*Assistant Examiner* — Henry Luong
(74) *Attorney, Agent, or Firm* — Tung & Associates

(57) ABSTRACT

The present invention discloses a light emitting device control method for adjusting the brightness of the light emitting device by an AC signal, comprising: receiving a signal having a turn ON angle and converting the signal to a DC signal; obtaining an average of the DC signal level, the average being a function of the turn ON angle; determining a reference voltage of a current source circuit according to the average of the DC signal level; and controlling a current flow through the light emitting device by the current source circuit.

36 Claims, 7 Drawing Sheets

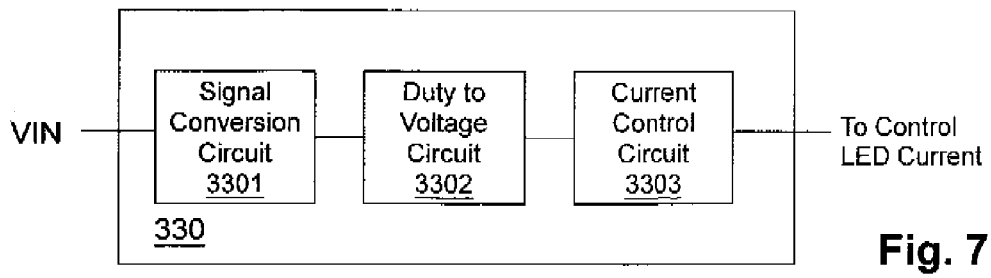
Fig. 7
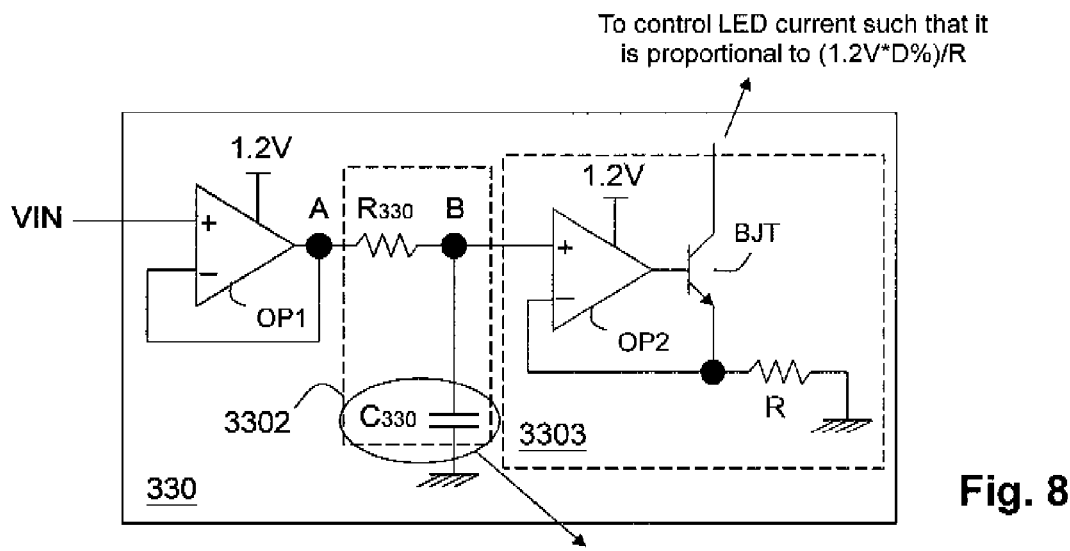
Fig. 8
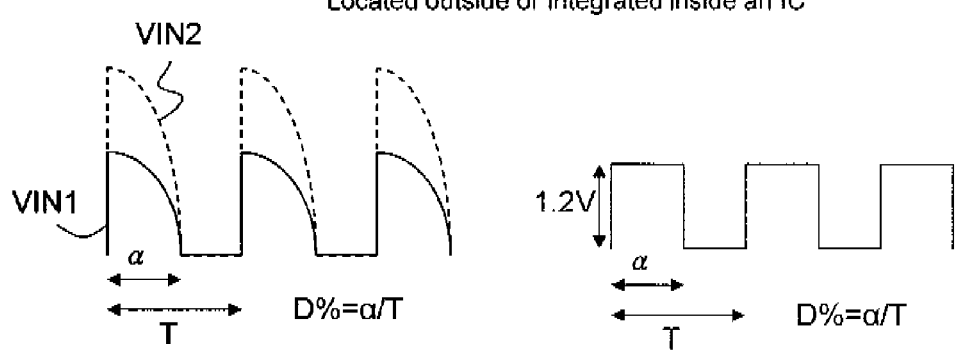
Fig. 9A   Fig. 9B

LED BULB, LIGHT EMITTING DEVICE CONTROL METHOD, AND LIGHT EMITTING DEVICE CONTROLLER CIRCUIT WITH DIMMING FUNCTION ADJUSTABLE BY AC SIGNAL

CROSS REFERENCE TO RELATED APPLICATIONS

This application claims the benefit of Provisional U.S. Patent Application No. 61/192,610, filed Sep. 18, 2008.

FIELD OF INVENTION

The present invention relates to a light emitting device controller circuit with dimming function adjustable by AC signal, wherein the light emitting device is, e.g., an LED (Light Emitting Diode).

DESCRIPTION OF RELATED ART

U.S. Pat. No. 7,358,679 discloses an LED bulb as shown in FIG. 1. Its benefit is that it can be readily applied to the light bulb socket designed for CCFL (Cold Cathode Fluorescent Lamp) which has already been provided in a building, without changing the previously built infrastructure for the light bulb socket. However in terms of brightness control, the traditional control mechanism for CCFL can not be applied to the LED bulb disclosed in U.S. Pat. No. 7,358,679. Referring to FIG. 2, a traditional method for controlling the brightness of a CCFL is to adjust the turn ON angle of an AC input by a TRIAC (Tri-electro AC) switch device. As shown in the figure, an AC signal 201 is converted to a TRIAC signal 209 with a turn ON angle α which is adjustable. However, in LED application, the brightness of an LED can not be directly controlled by an AC signal; in the circuit of the U.S. Pat. No. 7,358,679 shown in FIG. 1, a rectifier 11 converts an AC signal to a DC signal, and the DC signal passes through a low pass filter (LPF) 12 and a DC converter 13 so that it becomes a signal acceptable by the LED circuit 15. It is only after the AC signal is converted to a DC signal acceptable by the LED circuit 15 that the brightness can be adjusted by an adjustment circuit 14 in FIG. 1. In other words, in the circuit shown in U.S. Pat. No. 7,358,679, a user can not adjust the brightness of the LED bulb by adjusting an AC input, but must adjust the brightness of the LED bulb by controlling the adjustment circuit 14. In practical application, this means that when an AC switch and the LED bulb are located at two different locations (the former on a wall and the latter on a ceiling, for example), one must provide a wiring connecting the adjustment circuit 14 to the location where the AC switch is, which is apparently inconvenient.

U.S. Pat. No. 7,358,679 further discloses several application circuits, in which the DC converter is either a boost or a buck converter. However, such boost or buck converter has disadvantages in dealing with signals converted from an AC input.

SUMMARY OF THE INVENTION

An objective of the present invention is to provide a light emitting device controller circuit with dimming function adjustable by AC signal.

Another objective of the present invention is to provide an LED bulb with dimming function adjustable by AC signal.

Yet another objective of the present invention is to provide a method for adjusting the brightness of a light emitting device by AC signal.

According to the present invention, brightness can be adjusted at the AC input end directly. It is not required to convert the AC input signal to a DC signal, and to adjust the DC signal by an additional adjustment circuit.

In order to achieve the foregoing objective, the present invention provides a light emitting device controller circuit with dimming function adjustable by AC signal, comprising a controller which controls an operation of at least one power transistor to convert an input voltage to an output voltage to be supplied to a light emitting device, characterized in that the controller comprises a dimming circuit for controlling a current flow through the light emitting device, the dimming circuit comprising: a signal conversion circuit receiving a signal having a turn ON angle and converting the signal to a DC signal; an average circuit obtaining an average of the DC signal level, the average being a function of the turn ON angle; and a current control circuit for controlling a current flow through the light emitting device according to the average of the DC signal level.

In another aspect, the present invention provides a light emitting device controller circuit with dimming function adjustable by AC signal, comprising a controller which controls an operation of at least one power transistor to convert an input voltage to an output voltage to be supplied to a light emitting device, characterized in that the controller comprises a dimming circuit for controlling a current flow through the light emitting device, the dimming circuit comprising: a signal conversion circuit receiving a signal having a turn ON angle and converting the signal to a DC signal, the DC signal having a duty which is a function of the turn ON angle; a duty to voltage conversion circuit converting the duty of the DC signal to a voltage; and a current control circuit for controlling a current flow through the light emitting device according to the voltage converted from the duty of the DC signal.

In another aspect, the present invention provides an LED bulb with dimming function adjustable by AC signal, comprising: a rectifier receiving an AC voltage and rectifying the AC voltage to generate a rectified voltage; a DC converter providing an output voltage according to the rectified voltage; and an LED circuit coupled to the output voltage, wherein the DC converter includes a dimming circuit for controlling a current flow through the light emitting device, the dimming circuit comprising: a signal conversion circuit receiving a signal having a turn ON angle and converting the signal to a DC signal; an average circuit obtaining an average of the DC signal level, the average being a function of the turn ON angle; and a current control circuit for controlling a current flow through the light emitting device according to the average of the DC signal level.

In another aspect, the present invention provides an LED bulb with dimming function adjustable by AC signal, comprising: a rectifier receiving an AC voltage and rectifying the AC voltage to generate a rectified voltage; a DC converter providing an output voltage according to the rectified voltage; and an LED circuit coupled to the output voltage, wherein the DC converter includes a dimming circuit for controlling a current flow through the light emitting device, the dimming circuit comprising: a signal conversion circuit receiving a signal having a turn ON angle and converting the signal to a DC signal, the DC signal having a duty which is a function of the turn ON angle; a duty to voltage conversion circuit converting the duty of the DC signal to a voltage; and a current control circuit for controlling a current flow through the light emitting device according to the voltage converted from the duty of the DC signal.

In another aspect, the present invention provides a light emitting device control method for adjusting the brightness of the light emitting device by an AC signal, comprising: receiving a signal having a turn ON angle and converting the signal to a DC signal; obtaining an average of the DC signal level, the average being a function of the turn ON angle; determining a reference voltage of a current source circuit according to the average of the DC signal level; and controlling a current flow through the light emitting device by the current source circuit.

In another aspect, the present invention provides a light emitting device control method for adjusting the brightness of the light emitting device by an AC signal, comprising: receiving a signal having a turn ON angle and converting the signal to a DC signal, the DC signal having a duty which is a function of the turn ON angle; generating a voltage according to the duty of the DC signal; determining a reference voltage of a current source circuit according to the voltage generated according to the duty of the DC signal; and controlling a current flow through the light emitting device by the current source circuit.

The objectives, technical details, features, and effects of the present invention will be better understood with regard to the detailed description of the embodiments below, with reference to the drawings.

BRIEF DESCRIPTION OF THE DRAWINGS

FIG. 7 shows an embodiment of the dimming circuit 330.

FIG. 8 shows a more detailed embodiment of the dimming circuit 330.

FIG. 9A shows two possible waveforms of the input voltage VIN, VIN1 and VIN2.

FIG. 9B shows the signal waveform at the node A after the input voltage VIN has been processed by the operational amplifier OP1.

DESCRIPTION OF THE PREFERRED EMBODIMENTS

Figure 1:
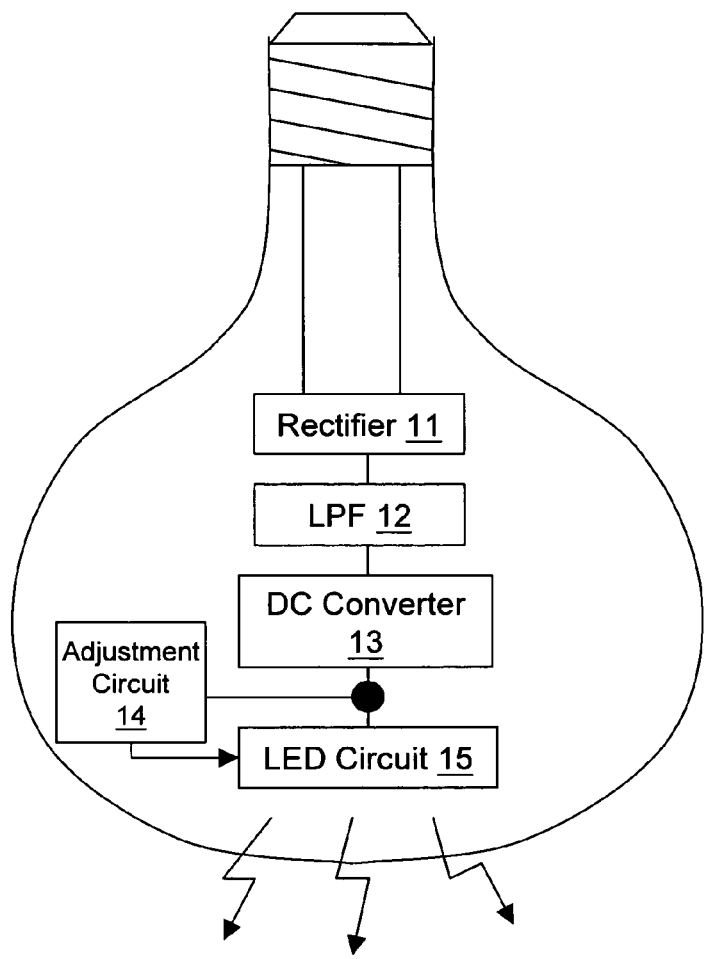
FIG. 1 is a schematic circuit diagram showing the internal circuit of an LED bulb according to prior art.
Figure 2:
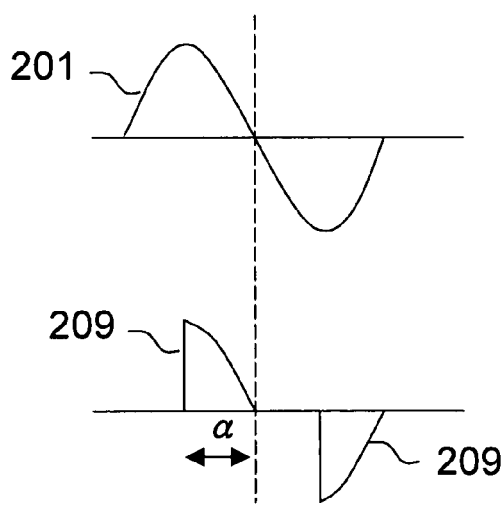
FIG. 2 shows how an AC signal is converted to a TRIAC signal having a turn ON angle.
Figure 3:
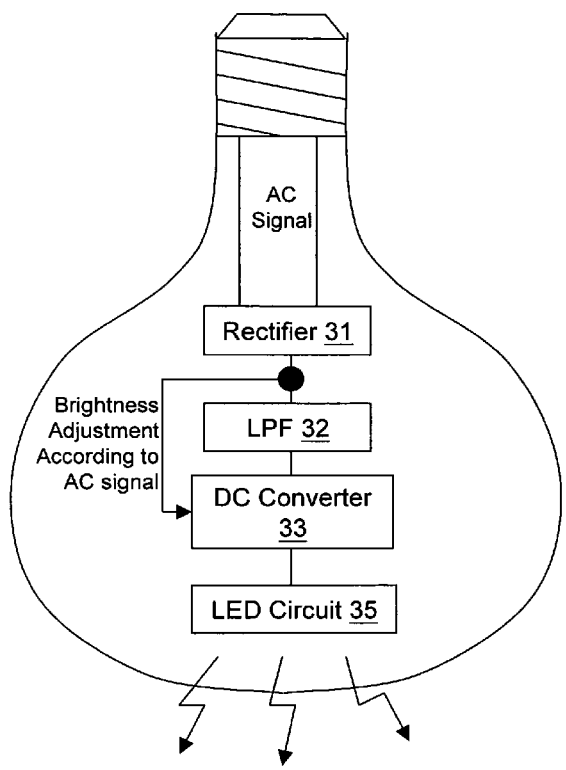
FIG. 3 shows an LED bulb according to the present invention.

FIG. 3 shows the basic concept of the present invention, wherein the DC converter 33 receives a signal having a brightness adjustment function resulting from an AC source, i.e., the brightness is determined by the AC signal, in contrast to the prior art shown in FIG. 1 wherein the brightness is determined by an adjustment circuit 14. Furthermore, the present invention has a simpler circuit than the prior art.

Figure 4:
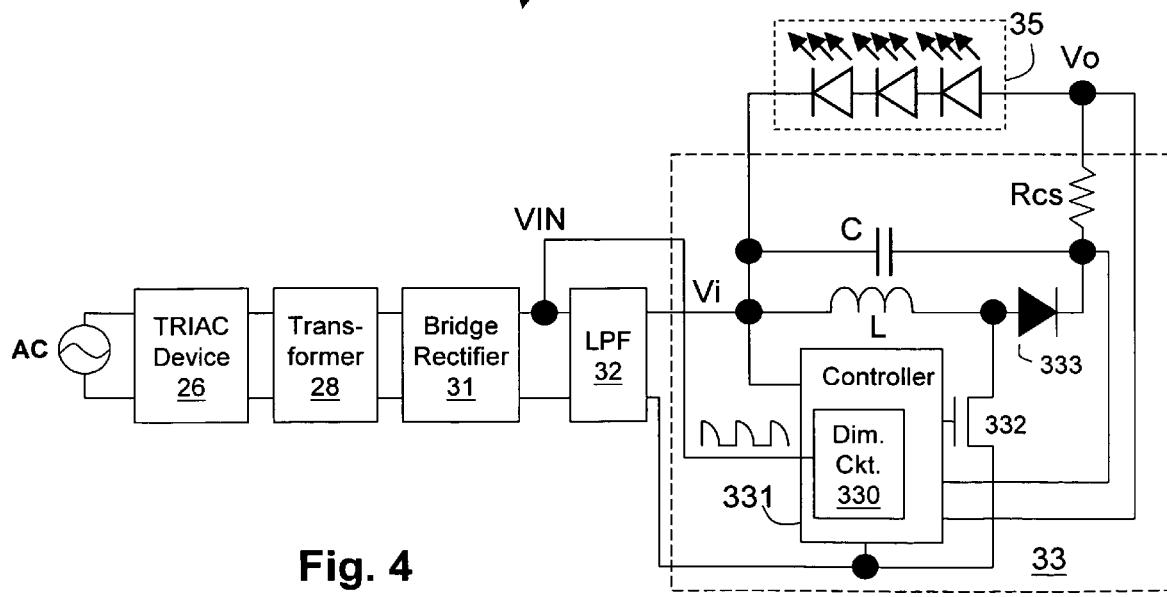
FIG. 4 shows an embodiment of the present invention.

Referring to FIG. 4, in one embodiment, an AC power is (but does not necessarily have to be) processed by a TRIAC device 26 outside of the light bulb, and transformed by a transformer 28; the transformed voltage is rectified by a bridge rectifier 31 inside the light bulb. Certainly, it can be embodied in such a way that the transformer 28, or even the TRIAC device 26, is included inside the light bulb. If an AC switch and the LED bulb is located at two different locations (the former on a wall and the latter on a ceiling, for example), the TRIAC device 26 can be located at a location near the AC switch so that it is convenient to adjust the brightness. The bridge rectifier 31 can be a full bridge rectifier or a half bridge rectifier. The rectified voltage passes through a low pass filter 32 and is then inputted to a DC converter 33. The low pass filter 32 for example can be circuit including a diode and a capacitor connected in series. In this invention, since the bridge rectifier 31 already includes diodes, the low pass filter 32 can include only a capacitor, without a diode. An example of the bridge rectifier 31 and the low pass filter 32 is disclosed in FIG. 5 of U.S. provisional application No. 61/192,610.

Figure 5A:
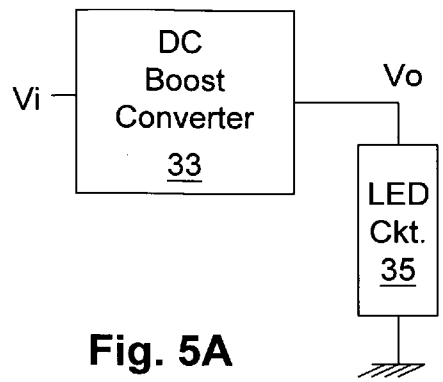
FIGS. 5A-5C show three embodiments of the DC converter 33 and the LED circuit 35, respectively.
Figure 5B:
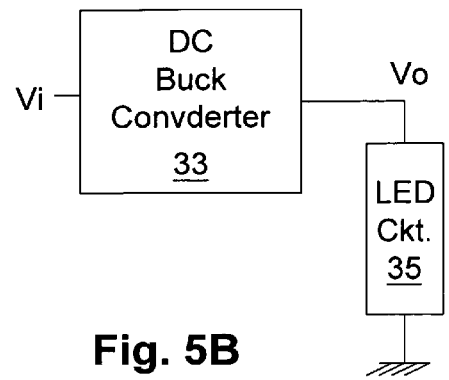
Figure 5C:
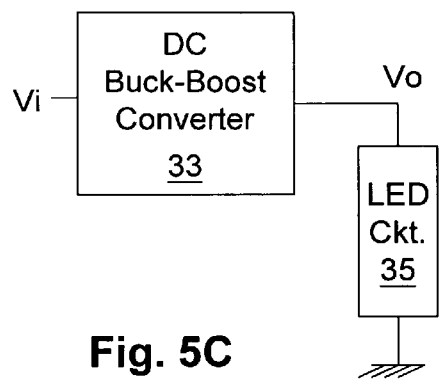

The DC converter 33 receives an input voltage Vi and converts it to an output voltage Vo. In one embodiment, as shown in FIG. 4, the LED circuit 35 is coupled between the input voltage Vi and the output voltage Vo, not between the output voltage Vo and ground. The reason for this is because there may not be a fixed relationship between the voltage required by the LED circuit 35 and the input voltage Vi. For example, depending on the power or brightness requirement of a product, the number of LEDs in the LED circuit 35 may be different. Thus, the voltage required by the LED circuit 35 may be higher or lower than the input voltage Vi. If the LED circuit 35 is coupled between the output voltage Vo and ground, then the LED circuit 35 operates according to the output voltage Vo, and in this case if the DC converter 33 is a boost converter, it can not handle the situation where Vo<Vi; if the DC converter 33 is a buck converter, it can not handle the situation where Vo>Vi. In the embodiment shown in the figure, the LED circuit 35 operates by the voltage (Vo−Vi), which can be higher or lower than Vi, but the DC converter 33 can handle both cases [(Vo−Vi)<Vi and (Vo−Vi)>Vi] by a boost structure. In other words, by coupling the LED circuit 35 between the output voltage Vo and the input voltage Vi, a boost converter can achieves both buck and boost conversion effects. But of course, one can couple the LED circuit 35 between the output voltage Vo and ground, and uses one of the arrangements as shown in FIGS. 5A-5C, i.e., the DC converter 33 may be a boost converter, a buck converter or a buck-boost converter according to the relationship between the operational voltage of the LED circuit 35 and the input voltage Vi. All such modifications should belong to the scope of the present invention.

Figure 5D:
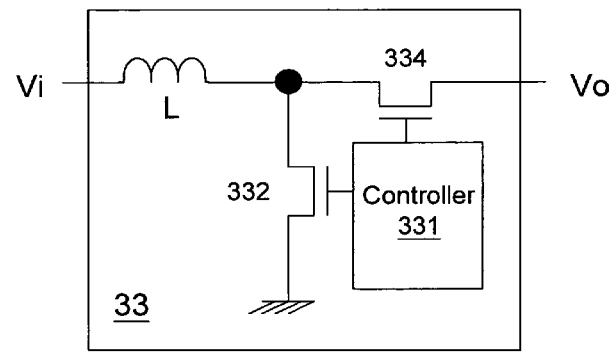
FIG. 5D shows that the DC converter 33 may be a synchronous boost converter.

The DC converter 33 shown in FIG. 4 is an asynchronous boost converter which comprises a controller 331, a power transistor 332, an inductor L and a diode 333. The controller 331 controls the operation of the power transistor 332, with the assistance from the inductor L and the diode 333, to convert the input voltage Vi to the output voltage Vo. However as shown in FIG. 5D, the diode 333 can be replaced by a power transistor 334 such that the DC converter 33 becomes a synchronous boost converter; certainly, this should also belong to the scope of the present invention. In addition, the controller 331 can be an integrated circuit by itself, or can be integrated with other devices such as with the power transistor 332, or with the power transistors 332 and 334. The resistor Rcs shown in the figure is for detecting the LED current for feedback control.

Figure 6A:
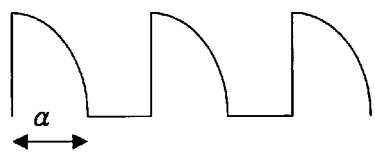
FIGS. 6A-6C show three possible waveforms of the input voltage VIN, respectively.
Figure 6B:
Figure 6C:
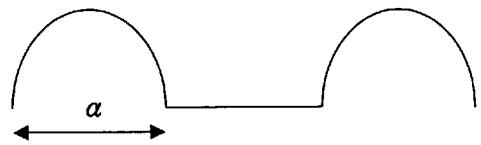

One important feature of the present invention is that the controller 331 includes a dimming circuit 330. The dimming circuit 330 is capable of receiving a signal having a turn ON angle (such as the shark fin signal VIN, also referred to as a phase-cut semi-sinusoidal signal, shown in FIG. 4) and adjusting the brightness according to the turn ON angle. The dimming circuit 330 can receive signals in the forms other than that shown in FIG. 4. For example, please refer to FIGS. 6A-6C; when an AC power is processed by the TRIAC device 26 and rectified by a full bridge rectifier 31, the resultant signal is as shown in FIG. 6A; when the AC power is processed by the TRIAC device 26 and rectified by a half bridge rectifier 31, the resultant signal is as shown in FIG. 6B; when the AC power is not processed by the TRIAC device 26 and is rectified by a half bridge rectifier 31, the resultant signal is as shown in FIG. 6C. The dimming circuit 330 can receive any of the above signal forms and adjust the LED brightness according to the turn ON angle $\alpha$. In other words, a user can determine the LED brightness at the AC input end by adjusting the turn ON angle $\alpha$ of an AC input signal. In practical application, the AC switch and the LED bulb can be located at two different locations, and a device for adjusting the turn ON angle $\alpha$ can be located near the AC switch, so that it is convenient to adjust the brightness.

FIG. 7 shows an embodiment of the dimming circuit 330 which includes a signal conversion circuit 3301, a duty to voltage conversion circuit 3302, and a current control circuit 3303. The function of the signal conversion circuit 3301 is to obtain information relating to the turn ON angle of the input signal VIN; it receives the input signal VIN having the turn ON angle and converts it to a DC signal relating to the turn ON angle. In this embodiment, the duty of the DC signal is a function of the turn ON angle. The duty to voltage conversion circuit 3302 converts the duty of the DC signal to a voltage. The current control circuit 3303 controls a current flow through the LED according to the voltage converted from the duty, to determine the brightness of the LEDs.

Referring to FIG. 8 in conjunction with FIGS. 9A and 9B, a more detailed circuit embodiment of the dimming circuit 330 is illustrated. For simplicity and convenience, let us assume that the AC power is first processed by the TRIAC device 26 and rectified by a full bridge rectifier 31, and the operational amplifier in the dimming circuit 330 operates by an operational voltage 1.2V; however, certainly the operational voltage can be any number. As shown in the figure, the operational amplifier OP1 receives an input signal VIN, which for example is a shark fin signal as shown in FIG. 6A, but as shown in FIG. 9A, due to different AC power specifications (such as 110V or 220V specification) or other reasons (such as different transformation ratio by different transformers 28), the input signal VIN may be of different levels as shown by VIN1 and VIN2. It will be understood from the following description that one advantage of the present invention is that different AC levels do not affect the dimming function.

The operational amplifier OP1 receives the input signal VIN and generates a square wave signal as shown in FIG. 9B, at its output (node A). The amplitude of the square wave signal is equal to the operational voltage of the operational amplifier OP1, and the duty ratio D % of the square wave signal is equal to the turn ON angle $\alpha$ of the input signal VIN divided by its period T, i.e., D %=$\alpha$/T. A resistor R330 and a capacitor C330 form an RC (Resistor-Capacitor) circuit 3302 which converts the duty to a voltage. A DC voltage having a level of 1.2V*D % is generated at the node B. A current source circuit 3303 constructed by an operational amplifier OP2, a bipolar transistor BJT and a resistor R uses the voltage 1.2V*D % as a reference voltage such that the current flow through the LEDs is proportional to (1.2V*D %)/R. In other words, a user can adjust the brightness of the LEDs at the AC input end by adjusting the turn ON angle $\alpha$. The transistor BJT shown in the figure is a bipolar transistor, but it can be replaced by a MOS transistor. And, depending on the capacitance of the capacitor C330, when the controller 331 is an integrated circuit, the capacitor C330 can be an external device outside of the integrated circuit, or integrated into the integrated circuit.

In comparison with prior art, besides the advantage that the brightness can be directly adjusted at the AC input end, the present invention is also advantageous in that its circuit is simpler. The present invention does not require the complicated adjustment circuit 14; it only requires adding an operational amplifier OP1 and an RC circuit 3302 to the controller 331 (the current source circuit 3303 is also required in the prior art, so this part of the circuit is not an increased overhead). Furthermore, because the LED brightness is only relevant to the duty ratio D % (i.e., only relevant to the turn ON angle $\alpha$ of the input signal VIN) but not relevant to the original AC voltage level, the same controller 331 can be applied to different AC power environments; an unstable AC power source does not affect the LED brightness, so the flashing problem due to power instability is also solved. Thus, the present invention is apparently superior to the prior art.

Figure 9C:
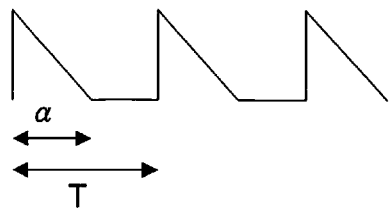
FIGS. 9C-9F show other possible waveforms generated by the signal conversion circuit 3301.
Figure 9D:
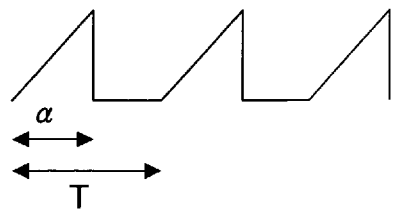
Figure 9E:
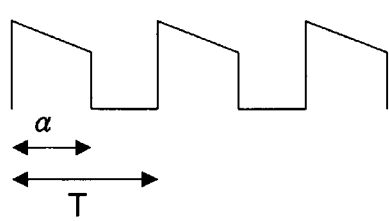
Figure 9F:
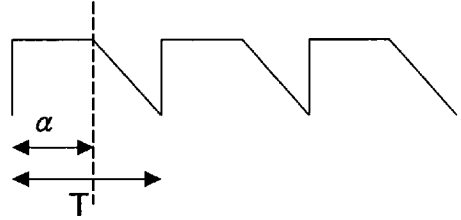
Figure 10:
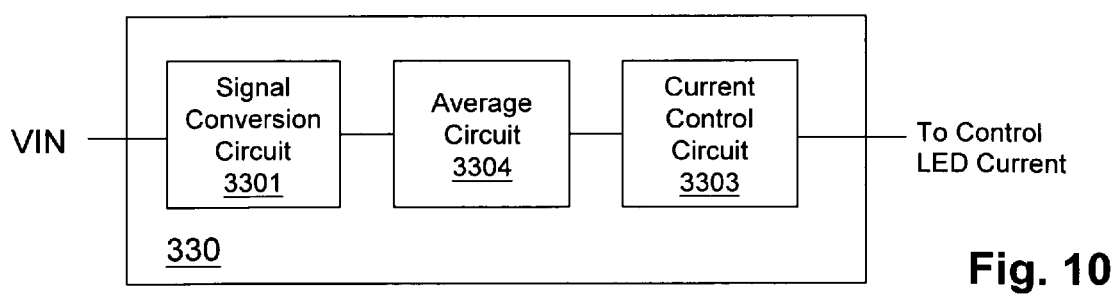
FIG. 10 shows another embodiment of the dimming circuit 330.

The embodiment shown in FIG. 8 and FIGS. 9A-9B is not the only way to embody the present invention. In the spirit of the present invention, the input signal VIN having the turn ON angle $\alpha$ does not have to be converted to a square wave; it suffices as long as the converted DC signal is a function of the turn ON angle $\alpha$. For example, the signal conversion circuit 3301 can convert the input signal VIN to any forms shown in FIGS. 9C-9F, or many other forms. When the converted DC signal does not have a clearly identifiable duty (such as the waveform shown in FIG. 9F), as shown in FIG. 10, an average circuit 3304 can be employed to obtain an average signal level of the DC signal. In this way, the brightness of the LEDs can be controlled according to the turn ON angle $\alpha$ as well. The average circuit 3304 for example can be an RC circuit similar to the circuit 3302.

Figure 11:
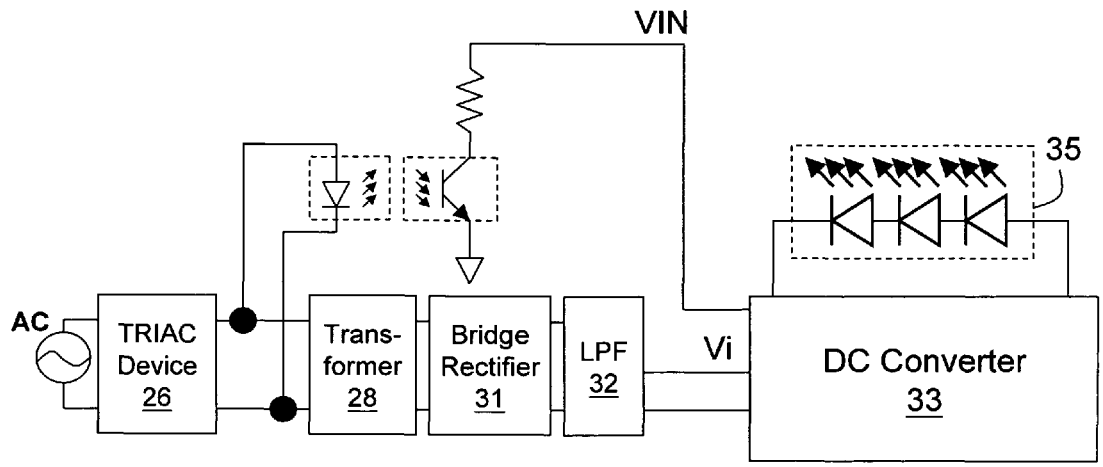
FIGS. 11 and 12 show that the signal having a turn ON angle can be obtained directly from the AC signal.
Figure 12:
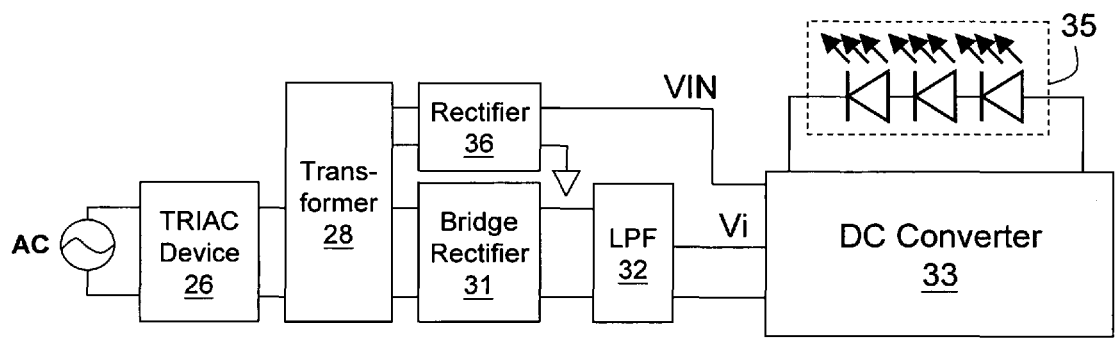
Figure 13:
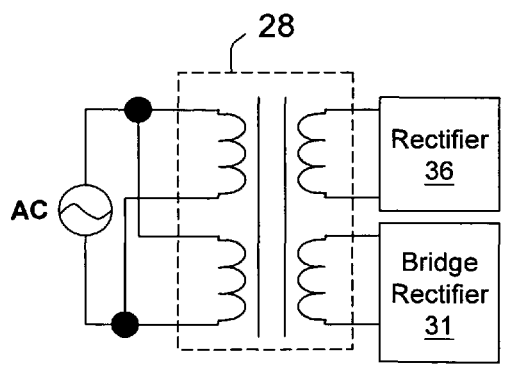
FIG. 13 shows an embodiment of the transformer 28.
Figure 14:
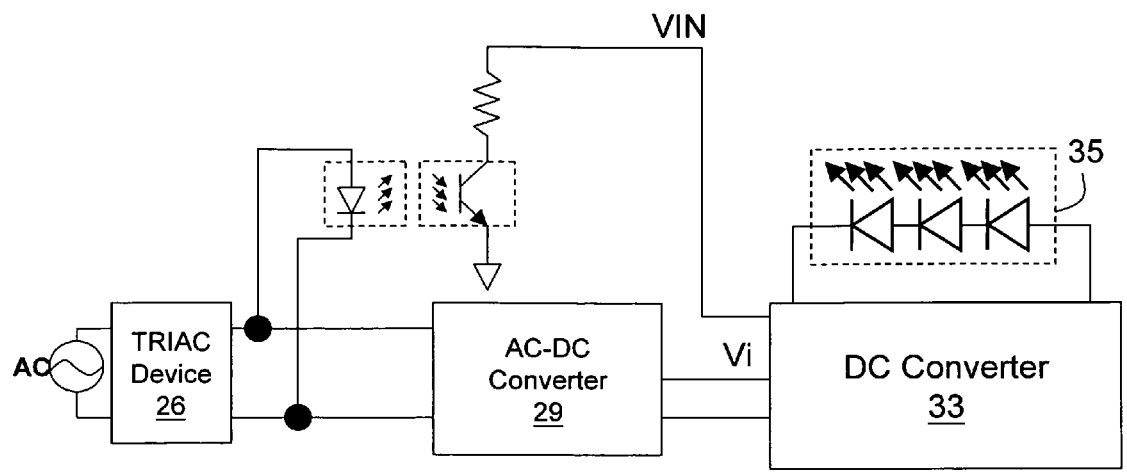
FIGS. 14 and 15 show embodiments wherein the transformer 28, the bridge rectifier 31 and the low pass filter 32 are replaced by an AC-DC converter 29.
Figure 15:
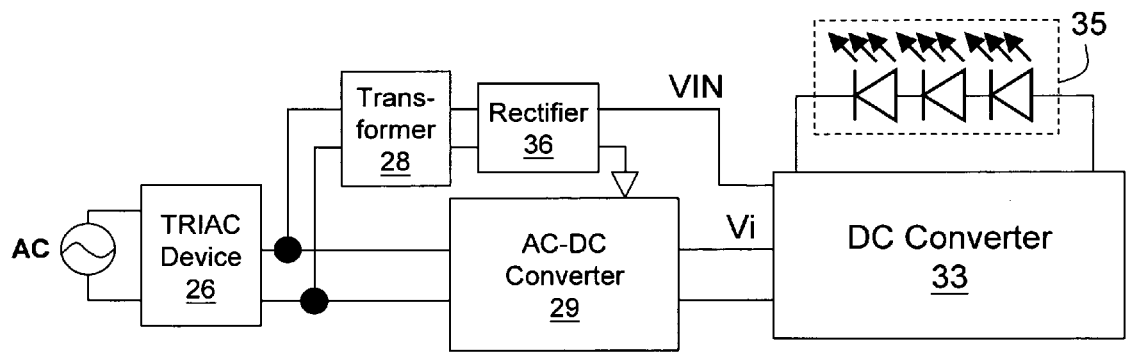

Note that what is shown in FIG. 4 is not the only way to obtain the signal VIN. The input signal VIN having the turn ON angle $\alpha$ does not have to come from the bridge rectifier 31; it can be directly obtained from an AC signal. For example, as shown in FIG. 11, after the AC signal is processed by the TRIAC device 26, the signal can be converted to the input signal VIN by photo coupling. Or, as shown in FIG. 12, it can be arranged so that in voltage transformation by the transformer 28, the power and the dimming signal are separated to two signals. To this end, the transformer 28 can include a structure as shown in FIG. 13, wherein the upper windings obtain the dimming signal and generate the signal VIN, while the lower windings obtain the power and generate the input voltage Vi. In this case the upper windings can have a smaller number of turns. Moreover, because the present invention allows to obtain the signal having the turn ON angle directly from an AC signal, the transformer 28, the bridge rectifier 31 and the low pass filter 32 can be replaced by an AC-DC converter 29, as shown in FIGS. 14 and 15.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the present invention can be applied to any light emitting device whose brightness can be adjusted by controlling a current flow therethrough, not limited to LEDs. In view of the foregoing, the spirit of the present invention should cover all such and other modifications and variations, which should be interpreted to fall within the scope of the following claims and their equivalents.

What is claimed is:

1. A light emitting device controller circuit with dimming function adjustable by AC signal, comprising a controller which controls an operation of at least one power transistor to convert an input voltage to an output voltage to be supplied to a light emitting device, characterized in that the controller comprises a dimming circuit for controlling a current flowing through the light emitting device, the dimming circuit comprising:
    a signal conversion circuit receiving a phase-cut semi-sinusoidal signal having a turn ON angle and converting the signal to a DC signal;
    an average circuit obtaining an average of the DC signal level, the average being a function of the turn ON angle irrespective of amplitude of the phase-cut semi-sinusoidal signal having the turn ON angle, whereby different amplitudes with the same turn ON angle result in the same average; and
    a current control circuit for controlling the current flowing through the light emitting device according to the average of the DC signal level.

2. The light emitting device controller circuit of claim 1, wherein the signal conversion circuit includes an operational amplifier having an input receiving the phase-cut semi-sinusoidal signal having the turn ON angle and another input coupled to the op-amp output.

3. The light emitting device controller circuit of claim 1, wherein the average circuit includes a resistor and a capacitor connected in series, the resistor having one end coupled to an output of the signal conversion circuit and another end coupled to the capacitor.

4. The light emitting device controller circuit of claim 3, wherein the signal conversion circuit, the resistor and the current control circuit are inside of an integrated circuit and the capacitor is outside of the integrated circuit.

5. The light emitting device controller circuit of claim 1, wherein the current control circuit includes a current source circuit which comprises:
    a transistor, a current flowing through the transistor determines the current flowing through the light emitting device;
    an operational amplifier having an output controlling a first terminal of the transistor to determine the current flowing through the transistor, an input coupled to an output of the average circuit and another input coupled to a second terminal of the transistor; and
    a resistor coupled to the second terminal of the transistor.

6. The light emitting device controller circuit of claim 1, wherein the light emitting device is coupled between an input voltage and the output voltage.

7. An light emitting diode (LED) bulb with dimming function adjustable by AC signal, comprising:
    a rectifier receiving an AC voltage and rectifying the AC voltage to generate a rectified voltage;
    a DC converter providing an output voltage according to the rectified voltage; and
    an LED circuit coupled to the output voltage, wherein the DC converter includes a dimming circuit for controlling a current flow through a light emitting device, the dimming circuit comprising:
        a signal conversion circuit receiving a phase-cut semi-sinusoidal signal having a turn ON angle and converting the signal to a DC signal;
        an average circuit obtaining an average of the DC signal level, the average being a function of the turn ON angle irrespective of amplitude of the phase-cut semi-sinusoidal signal having the turn ON angle, whereby different amplitudes with the same turn ON angle result in the same average; and
        a current control circuit for controlling the current flowing through the light emitting device according to the average of the DC signal level.

8. The LED bulb of claim 7, wherein the signal conversion circuit includes an operational amplifier having an input receiving the phase-cut semi-sinusoidal signal having the turn ON angle and another input coupled to the op-amp output.

9. The LED bulb of claim 7, wherein the average circuit includes a resistor and a capacitor connected in series, the resistor having one end coupled to an output of the signal conversion circuit and another end coupled to the capacitor.

10. The LED bulb of claim 7, wherein the current control circuit includes a current source circuit which comprises:
    a transistor, the current flowing through the transistor determines the current flowing through the light emitting device;
    an operational amplifier having an output controlling a first terminal of the transistor to determine the current flowing through the transistor, an input coupled to an output of the average circuit and another input coupled to a second terminal of the transistor; and
    a resistor coupled to the second terminal of the transistor.

11. The LED bulb of claim 7, wherein the light emitting device is coupled between an input voltage and an output voltage.

12. The LED bulb of claim 7, wherein the phase-cut semi-sinusoidal signal having the turn ON angle is obtained from the rectified voltage.

13. The LED bulb of claim 7, wherein the phase-cut semi-sinusoidal signal having the turn ON angle is obtained from the AC signal.

14. A light emitting device control method for adjusting a brightness of the light emitting device by an AC signal, comprising:
    receiving a phase-cut semi-sinusoidal signal having a turn ON angle and converting the signal to a DC signal;
    obtaining an average of the DC signal level, the average being a function of the turn ON angle irrespective of amplitude of the phase-cut semi-sinusoidal signal having the turn ON angle, whereby different amplitudes with the same turn ON angle result in the same average;
    determining a reference voltage of a current source circuit according to the average of the DC signal level; and
    controlling a current flowing through the light emitting device by the current source circuit.

15. The method of claim 14, further comprising: generating the phase-cut semi-sinusoidal signal having the turn ON angle according to the AC signal.

16. The method of claim 14, further comprising: receiving an AC voltage and converting the AC voltage to a TRIAC signal; and rectifying the TRIAC signal to generate the phase-cut semi-sinusoidal signal having the turn ON angle.

17. The method of claim 14, further comprising: receiving an AC voltage and converting the AC voltage to a TRIAC signal; performing voltage transformation on the TRIAC signal; and rectifying the voltage transformed TRIAC signal to generate the phase-cut semi-sinusoidal signal having the turn ON angle.

18. The method of claim 14, further comprising: providing power to the light emitting device by a DC converter; and coupling the light emitting device between an input voltage and an output voltage of the DC converter.

19. A light emitting device controller circuit with dimming function adjustable by AC signal, comprising a controller which controls an operation of at least one power transistor to convert an input voltage to an output voltage to be supplied to a light emitting device, characterized in that the controller comprises a dimming circuit for controlling a current flowing through the light emitting device, the dimming circuit comprising:
    a signal conversion circuit receiving a phase-cut semi-sinusoidal signal having a turn ON angle and converting the signal to a DC signal, the DC signal having a duty which is a function of the turn ON angle irrespective of amplitude of the phase-cut semi-sinusoidal signal having the turn ON angle, whereby different amplitudes with the same turn ON angle result in the same duty;
    a duty to voltage conversion circuit converting the duty of the DC signal to a voltage; and
    a current control circuit for controlling the current flowing through the light emitting device according to the voltage converted from the duty of the DC signal.

20. The light emitting device controller circuit of claim 19, wherein the signal conversion circuit includes an operational amplifier having an input receiving the phase-cut semi-sinusoidal signal having the turn ON angle and another input coupled to the op-amp output.

21. The light emitting device controller circuit of claim 19, wherein the duty to voltage conversion circuit includes a resistor and a capacitor connected in series, the resistor having one end coupled to an output of the signal conversion circuit and another end coupled to the capacitor.

22. The light emitting device controller circuit of claim 21, wherein the signal conversion circuit, the resistor and the current control circuit are inside of an integrated circuit and the capacitor is outside of the integrated circuit.

23. The light emitting device controller circuit of claim 19, wherein the current control circuit includes a current source circuit which comprises:
    a transistor, the current flowing through the transistor determines the current flowing through the light emitting device;
    an operational amplifier having an output controlling a first terminal of the transistor to determine the current flowing through the transistor, an input coupled to an output of the duty to voltage conversion circuit and another input coupled to a second terminal of the transistor; and
    a resistor coupled to the second terminal of the transistor.

24. The light emitting device controller circuit of claim 19, wherein the light emitting device is coupled between an input voltage and the output voltage.

25. An light emitting diode (LED) bulb with dimming function adjustable by AC signal, comprising:
    a rectifier receiving an AC voltage and rectifying the AC voltage to generate a rectified voltage;
    a DC converter providing an output voltage according to the rectified voltage; and
    an LED circuit coupled to the output voltage, wherein the DC converter includes a dimming circuit for controlling a current flowing through a light emitting device, the dimming circuit comprising:
        a signal conversion circuit receiving a phase-cut semi-sinusoidal signal having a turn ON angle and converting the signal to a DC signal, the DC signal having a duty which is a function of the turn ON angle irrespective of amplitude of phase-cut semi-sinusoidal signal having the turn ON angle, whereby different amplitudes with the same turn ON angle result in the same duty;
        a duty to voltage conversion circuit converting the duty of the DC signal to a voltage; and
        a current control circuit for controlling the current flowing through the light emitting device according to the voltage converted from the duty of the DC signal.

26. The LED bulb of claim 25, wherein the signal conversion circuit includes an operational amplifier having an input receiving the phase-cut semi-sinusoidal signal having the turn ON angle and another input coupled to the op-amp output.

27. The LED bulb of claim 25, wherein the duty to voltage conversion circuit includes a resistor and a capacitor connected in series, the resistor having one end coupled to an output of the signal conversion circuit and another end coupled to the capacitor.

28. The LED bulb of claim 25, wherein the current control circuit includes a current source circuit which comprises:
    a transistor, the current flowing through the transistor determines the current flowing through the light emitting device;
    an operational amplifier having an output controlling a first terminal of the transistor to determine a current flow through the transistor, an input coupled to an output of the duty to voltage conversion circuit and another input coupled to a second terminal of the transistor; and
    a resistor coupled to the second terminal of the transistor.

29. The LED bulb of claim 25, wherein the light emitting device is coupled between an input voltage and the output voltage.

30. The LED bulb of claim 25, wherein the phase-cut semi-sinusoidal signal having the turn ON angle is obtained from the rectified voltage.

31. The LED bulb of claim 25, wherein the phase-cut semi-sinusoidal signal having the turn ON angle is obtained from the AC signal.

32. A light emitting device control method for adjusting a brightness of the light emitting device by an AC signal, comprising:
    receiving a phase-cut semi-sinusoidal signal having a turn ON angle and converting the signal to a DC signal, the DC signal having a duty which is a function of the turn ON angle irrespective of amplitude of the phase-cut semi-sinusoidal signal having the turn ON angle, whereby different amplitudes with the same turn ON angle result in the same duty;
    generating a voltage according to the duty of the DC signal;
    determining a reference voltage of a current source circuit according to the voltage generated according to the duty of the DC signal; and
    controlling a current flowing through the light emitting device by the current source circuit.

33. The method of claim 32, further comprising: generating the phase-cut semi-sinusoidal signal having the turn ON angle according to the AC signal.

34. The method of claim 32, further comprising: receiving an AC voltage and converting the AC voltage to a TRIAC signal; and rectifying the TRIAC signal to generate the phase-cut semi-sinusoidal signal having the turn ON angle.

35. The method of claim 32, further comprising: receiving an AC voltage and converting the AC voltage to a TRIAC signal; performing voltage transformation on the TRIAC signal; and rectifying the voltage transformed TRIAC signal to generate the phase-cut semi-sinusoidal signal having the turn ON angle.

36. The method of claim 32, further comprising: providing power to the light emitting device by a DC converter; and coupling the light emitting device between an input voltage and an output voltage of the DC converter.

\* \* \* \* \*